United States Patent
Kubek

(10) Patent No.: US 11,933,958 B2
(45) Date of Patent: Mar. 19, 2024

(54) MICROSCOPE AND SYSTEM COMPRISING SUCH A MICROSCOPE FOR EXAMINATION OF AN INCUBATED SAMPLE AND CORRESPONDING METHOD

(71) Applicant: Leica Microsystems CMS GmbH, Wetzlar (DE)

(72) Inventor: Martin Kubek, Driedorf (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 156 days.

(21) Appl. No.: 17/239,834

(22) Filed: Apr. 26, 2021

(65) Prior Publication Data

US 2021/0333534 A1  Oct. 28, 2021

(30) Foreign Application Priority Data

Apr. 28, 2020 (EP) ..................................... 20171926

(51) Int. Cl.
| | |
|---|---|
| *G02B 21/00* | (2006.01) |
| *G02B 21/26* | (2006.01) |
| *G02B 21/28* | (2006.01) |
| *G02B 21/30* | (2006.01) |
| *G02B 21/36* | (2006.01) |

(52) U.S. Cl.
CPC ......... *G02B 21/30* (2013.01); *G02B 21/0032* (2013.01); *G02B 21/26* (2013.01); *G02B 21/28* (2013.01); *G02B 21/361* (2013.01)

(58) Field of Classification Search
CPC ............................ G02B 21/00; G02B 21/0004; G02B 21/0016; G02B 21/0032; G02B 21/0088; G02B 21/24; G02B 21/26; G02B 21/28; G02B 21/30; G02B 21/361; G02B 21/362; G02B 7/00; G02B 7/20; G02B 7/22; G02B 7/24
USPC .................................................. 359/368–398
See application file for complete search history.

(56) References Cited

U.S. PATENT DOCUMENTS

| | | | |
|---|---|---|---|
| 7,382,531 B2 * | 6/2008 | Tsuchiya ............ | G02B 27/0006 359/398 |
| 7,382,532 B2 * | 6/2008 | Okugawa ........... | G02B 21/0088 359/395 |

(Continued)

FOREIGN PATENT DOCUMENTS

EP  1767615 A1  3/2007

*Primary Examiner* — Thong Q Nguyen
(74) *Attorney, Agent, or Firm* — Patentbar International

(57) ABSTRACT

The invention relates to a microscope for microscopic examination of a sample comprising a microscope housing enclosing an illumination optics, a microscope stage and an imaging optics, an integrated sample chamber located within the microscope housing and formed by a separated housing section within the microscope housing. The housing section has a lid which provides direct access to the microscope stage for placing the sample in the sample chamber. The housing section has an interface for connection of an external incubation environment conditioning unit to the sample chamber. The interface is configured to provide a connection between the external incubation environment conditioning unit and the sample chamber, such that the environmental conditions in the sample chamber can be controlled when the external incubation environment conditioning unit is connected to the interface.

17 Claims, 3 Drawing Sheets

(56) References Cited

U.S. PATENT DOCUMENTS

| | | | |
|---|---|---|---|
| 7,649,686 B2 * | 1/2010 | Harada | G01N 21/6458 |
| | | | 359/391 |
| 7,884,999 B2 | 2/2011 | Shimada | |
| 7,980,696 B1 | 7/2011 | Taki et al. | |
| 11,761,881 B2 * | 9/2023 | Christ | C12M 41/14 |
| | | | 359/385 |
| 2005/0282268 A1 | 12/2005 | Kagayama | |
| 2007/0234829 A1 | 10/2007 | Pirsch et al. | |
| 2017/0092535 A1 * | 3/2017 | Kimihiko | H01L 23/53238 |
| 2021/0333197 A1 * | 10/2021 | Christ | G02B 21/24 |
| 2022/0226829 A1 | 7/2022 | Schulz et al. | |

\* cited by examiner

MICROSCOPE AND SYSTEM COMPRISING SUCH A MICROSCOPE FOR EXAMINATION OF AN INCUBATED SAMPLE AND CORRESPONDING METHOD

RELATED APPLICATIONS

This application claims priority to European Patent Application EP 20171926.7, filed Apr. 28, 2020, which is incorporated herein by reference in its entirety.

FIELD OF THE INVENTION

The present inventive concept is directed to a microscope and to a system comprising such a microscope for microscopic examination of a sample, particularly for examination of a sample to be located in a sample chamber where the sample chamber is to be incubated with an incubation atmosphere adapted to the sample. The present inventive concept is further directed to a method for equipping a microscope with an incubated sample chamber.

BACKGROUND OF THE INVENTION

Especially in the field of microscopic examination of living samples like cells, it is of great interest to keep the sample as long as possible under favourable and stress-free environmental conditions. To this end, incubators are used for generating a microclimate adapted to the sample to be examined. Existing incubators can be distinguished in stage top incubators, on the one hand, and cage incubators, on the other hand.

Cage incubators comprise a climatic chamber enclosing the entire microscope such that a large volume needs to be incubated. Access to the working area for placing or manipulating the sample is impaired since the microscope itself is located within the cage incubator. Further, it is hardly possible to equip a microscope with a cage incubator in a space-saving manner. On the other hand, a stage top incubator provides a small volume to be incubated as the stage top incubator only encloses the sample itself and is placed onto the microscope stage. Even if a stage top incubator has minimum space requirements, access to the sample is impaired since the sample is surrounded by a sealed box which would have to be opened, thus, destroying the incubation atmosphere within the box. While a cage incubator has a high energy and gas consumption, a stage top incubator provides a small closed incubated room including connected supply conduits for supplying the desired incubation atmosphere.

SUMMARY OF THE INVENTION

In view of the drawbacks described above, there is a need for an improved incubation solution in microscopes, such a solution particularly providing the possibility of retrofitting an existing microscope with an incubation facility.

Embodiments of the present inventive concept provide a microscope for microscopic examination of a sample, the microscope comprising a microscope housing enclosing an illumination optics, a microscope stage and an imaging optics, further comprising an integrated sample chamber located within the microscope housing and formed by a separated housing section within said microscope housing, the housing section comprising a lid providing direct access to the microscope stage for placing the sample in the sample chamber. In other words, the housing section comprises an opening or recess which is closable by a "lid" which term is meant to be understood also as a door or a hood or a window or other equivalent means for opening and closing. The housing section further comprises an interface for connection of an external incubation environment conditioning unit to the sample chamber, the interface being configured to provide a connection between the external incubation environment conditioning unit and the sample chamber such that the environment conditions/incubation atmosphere in the sample chamber can be controlled when the external incubation environment conditioning unit is connected to the interface.

The present inventive concept can thus provide a microscope including a relatively large sample chamber which can be incubated and, at the same time, which provides easy access to the sample itself without accepting the disadvantages involved with existing incubation solutions as described above. As a dedicated sample chamber is formed by a separated housing section, a larger incubation room can be designed compared to stage top incubators, at the same time avoiding a bulky cage incubator arrangement. Further, the door/lid/window of the housing section enables easy access into the sample chamber for placing or manipulating the sample on the microscope stage.

DETAILED DESCRIPTION OF THE PREFERRED EMBODIMENTS

Figure 1:
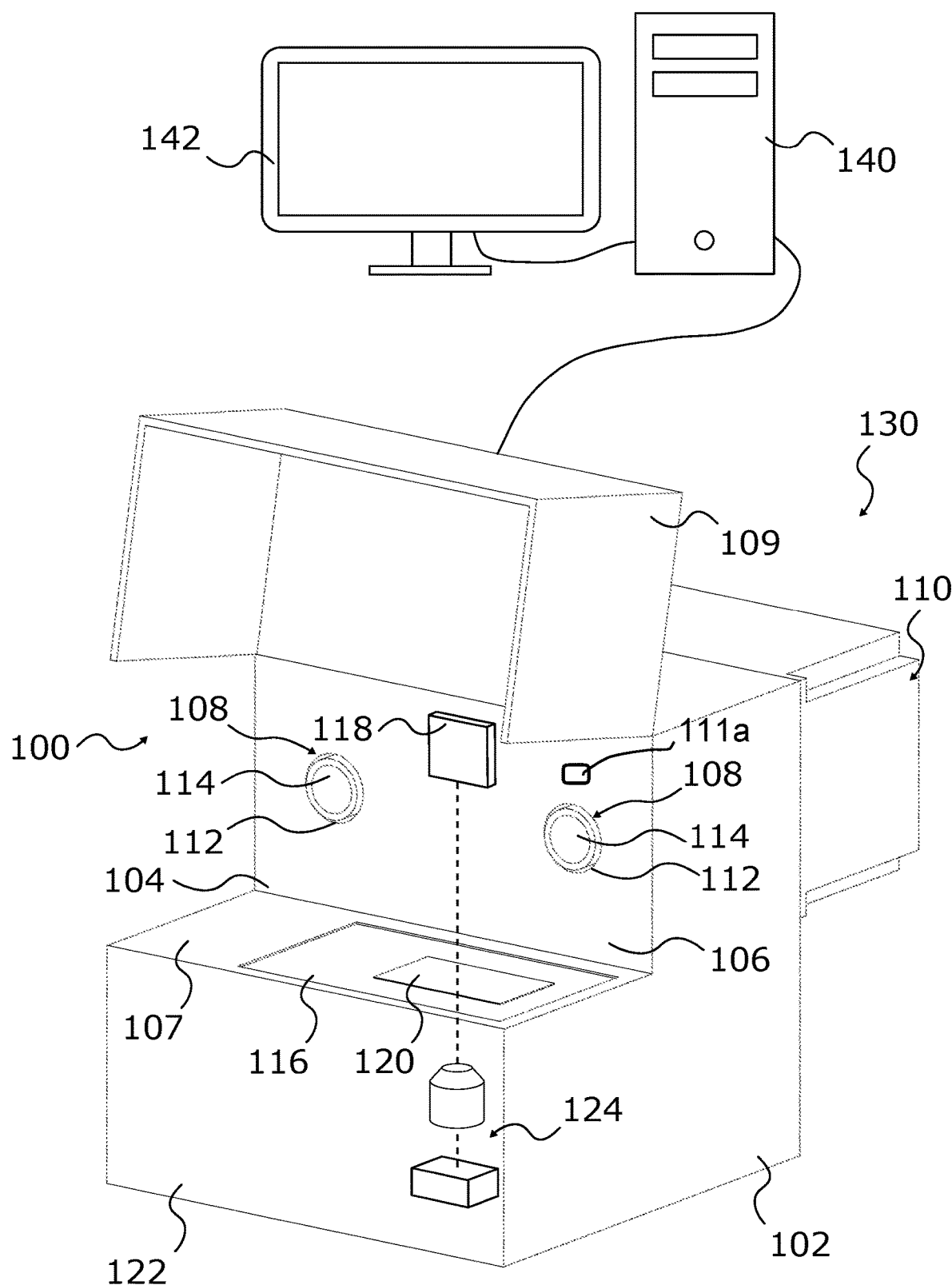
FIG. 1 schematically shows a perspective view of an embodiment of a system according to the inventive concept, FIG. 2 schematically shows a perspective view of assembling a microscope with an incubation atmosphere conditioning unit, and FIG. 3 schematically shows a side view of the situation in FIG. 2.

In an advantageous embodiment, the housing section of the microscope housing is configured such that, when the lid is closed, the sample chamber is sealed. By sealing, particularly hermetically sealing the sample chamber, any losses of incubation atmosphere due to leakage can be minimised.

In an advantageous embodiment, the housing section encloses, at least partly, the microscope stage and a working area for placing the sample on the microscope stage. The microscope stage of the microscope typically comprises a microscope stage tabletop movable in an x-y-direction including corresponding driving means. For placing the sample on the microscope stage, particularly on the microscope stage tabletop, a working area above, to the left and to the right of the sample is provided allowing access to the sample for a user, a robot and/or any manipulators. Frequently, next to the upper side of the microscope stage/microscope stage tabletop a working surface is provided serving as a shelf space for any instruments or other samples to be examined. In this context, it is advantageous if the housing section is bounded downward by the working surface including an upper side of the microscope stage, e.g. the microscope stage tabletop.

Especially in case of an inverse transmitted-light microscope it is advantageous if the housing section additionally encloses the illumination optics of the microscope. The illumination optics typically comprises an (LED) light source and a collimator lens as the main components and possibly other optical elements, like filters etc.

The housing section may be bounded lateralward and upward by said lid in form of a hinged lid or hinged door and/or by side walls of the housing section.

In an advantageous embodiment, the interface comprises at least one opening, also meant to be a duct, which is configured to receive a conduit, also meant to be a tube or pipe, which itself is connected to the external incubation environment conditioning unit. In a different embodiment, the interface comprises at least one opening, also meant to be a duct, including a conduit, also meant to be a tube or pipe, which itself is connectable to the external incubation environment conditioning unit. The at least one conduit (or tube or pipe) serves the purpose of supplying incubation atmosphere into the sample chamber, the incubation atmosphere being adapted to the sample to be examined. In the above embodiments, the at least one conduit may be connected to the conditioning unit either directly, e.g. by welding or by a flange connection, or indirectly, e.g. by using an adapter which may be mounted to the backside of the microscope for carrying the load of the conditioning unit. As discussed later, the at least one conduit may also comprise sensors or sensor leads for sensors detecting parameters of the incubation atmosphere and/or cables and lines for a communication between the microscope controlling unit and the conditioning unit controller.

In an advantageous embodiment, the at least one opening is configured to be closed in a light-tight manner when the microscope is operated without the external incubation environment conditioning unit. This measure avoids scattered light invading from the outside into the sample chamber.

It is advantageous if the interface comprises a plurality of openings for respective conduits for supplying and discharging incubation atmosphere. Such an arrangement can ensure a homogeneous distribution of incubation atmosphere within the sample chamber.

While it is possible to have one conduit for supplying and another conduit for discharging incubation atmosphere, it is also possible if at least one conduit is formed in a two-part form with a split cross-section area which defines two fluid paths separated from each other in the longitudinal direction for supplying incubation atmosphere through one of the two fluid paths and for discharging incubation atmosphere through the other one of the two fluid paths. By this arrangement optimal circulation of the incubation atmosphere can be accomplished.

It is advantageous if at least one conduit comprises fins at its end facing the sample chamber. Such fins can influence the flow directions and either induce a desired flow direction of the incubation atmosphere flowing through the sample chamber or generate a turbulent flow within the sample chamber.

As already mentioned above, it is advantageous if the microscope comprises at least one sensor for sensing at least one parameter of the incubation atmosphere, particularly at least one of the sensors being integrated, at least partly, into a conduit of said at least one conduit for supplying incubation atmosphere to the sample chamber. More particularly, such sensors can be located in a conduit and/or in the sample chamber itself. Sensors for detecting the humidity ($H_2O$) and/or the contents of nitrogen ($N_2$) and/or oxygen ($O_2$) and/or carbon dioxide ($CO_2$) and/or for detecting the temperature of the incubation atmosphere should be provided.

It is advantageous if the interface is located at a backside of the housing section and thus the incubation environment conditioning unit to be connected directly or indirectly to the interface (see above) is mounted to the backside of the housing section and thus to the backside of the microscope. This arrangement ensures that examination, as well as changing and manipulating the sample are not hindered by the incubation environment conditioning unit. Further, it makes retrofitting of a microscope with such an incubation environment conditioning unit easier.

In an advantageous embodiment, the microscope is an inverse transmitted-light microscope, wherein the housing section encloses, at least partly, the microscope stage of the microscope and a transmitted-light illumination unit as the illumination optics of the microscope, and wherein a second housing section is provided which second housing section encloses, at least partly, the imaging optics of the microscope. With such an arrangement, the microscope is essentially divided in two parts, a first part being formed by the first housing section comprising e.g. the top side of the microscope stage and the illumination optics, and a second part in form of a second housing section enclosing e.g. the microscope objective and an image detector of the microscope and, possibly, the lower side of the microscope stage. Parts of the illumination optics as well as parts of the imaging optics, like a camera or a display displaying the microscopic image of the sample, can also be located outside the first and second housing section, respectively.

By providing two different separated housing sections within the microscope housing, it is possible to incubate and/or air-condition and/or temperature-control both housing sections independently from each other. While the first housing section is incubated, the second housing section can simply be air-conditioned by supplying air or another atmosphere preferably at a predetermined temperature. This is particularly advantageous in case of using immersion objectives for microscopic examination of a sample.

In a second aspect of the present inventive concept, a system for microscopic examination of the sample is provided, said system comprising a microscope according to the above first aspect of the inventive concept and an incubation environment conditioning unit connected to the microscope via said microscope interface.

In an advantageous embodiment of the second aspect of the present inventive concept, the incubation environment conditioning unit comprises at least one of the following connections: a connection for supplying $H_2O$, a connection for discharging $H_2O$ and/or incubation atmosphere, a connection for supplying $N_2$ and/or $O_2$, a connection for supplying $CO_2$ into the sample chamber. In live cell imaging, the incubation environment conditioning unit should typically be able to control temperature, humidity and $CO_2$ content of the incubation atmosphere. To this end, separate connections for supplying $H_2O$ and $CO_2$, remainder air, should be present. The resulting incubation atmosphere is supplied through the at least one conduit placed into or being part of the microscope interface into the sample chamber. Typically, the corresponding connections into the sample chamber are combined, e.g. in the form of said conduit(s). It is, however, also possible to provide air, humidity and $CO_2$ through separate connections into the sample chamber. On the other hand, it is also desirable to conduct hypoxia experiments where an oxygen deficiency in the incubation atmosphere is present. An oxygen deficiency is typically established by supplying nitrogen ($N_2$) into the incubation atmosphere. It is also advantageous to have a connection for discharging $H_2O$ and/or incubation atmosphere in order to uphold a circulation of atmosphere and/or to refresh the atmosphere.

In an advantageous embodiment, the microscope comprises a controlling unit that controls functional components of the microscope for controlling the microscopic examination of the sample. Such functional components typically are the illumination optics, the imaging optics and the microscope stage of the microscope. In this embodiment, the controlling unit is further configured to control the operation of the incubation environment conditioning unit when the external incubation environment conditioning unit is connected to the interface. Cables and lines for communication between the microscope controlling unit and the conditioning unit controller can be guided through one or more of the above openings of the interface. This embodiment enables a very user-friendly operation of the microscope including the incubated sample chamber. Particularly, the microscope including the microscope interface and the connected incubation environment conditioning unit can be controlled through a universal software interface having a graphical user interface (GUI) which is preferably adapted to the various possible kinds of experiments. In case of e.g. an hypoxia experiment, the user can set the desired temperature, humidity and $CO_2$ content as well as the desired $O_2$ content of the incubation atmosphere through corresponding buttons in the GUI. Preferably, default values for the respective parameters are shown in the GUI, which can be changed by the user. Furthermore, parameters of functional components of the microscope can be set through the same GUI, e.g. the kind of sample, the illumination wavelength, camera parameters etc. After a sensor has detected the closing of the lid such that the sample chamber is sealed, generation of the user-defined incubation atmosphere starts by introducing air with predetermined contents of $H_2O$ and $CO_2$ into the sample chamber. Additionally, $N_2$ is introduced for displacing $O_2$ in order to reduce the $O_2$ content. A part of the incubation atmosphere may escape through leaks and/or through a connection/conduit for discharging incubation atmosphere. At the same time, the functional components of the microscope are set to the desired settings for proper microscopic examination/imaging of the sample. Once the settings and the incubation atmosphere are accomplished, examination/imaging of the sample by the microscope is carried out.

In a last aspect, the present inventive concept relates to a method for equipping or retrofitting a microscope with an external incubation environment conditioning unit for incubating a sample chamber of the microscope. Said microscope comprises a microscope housing enclosing an illumination optics, a microscope stage and an imaging optics, further an integrated sample chamber located within the microscope housing and formed by a separated housing section within said microscope housing. The housing section comprises a lid providing direct access to the microscope stage for placing the sample in the sample chamber. Further, the housing section comprises an interface for connection of the external incubation environment conditioning unit to the sample chamber. The interface is configured to provide a connection between the external incubation environment conditioning unit and the sample chamber such that the environmental conditions in the sample chamber can be controlled when the external incubation environment conditioning unit is connected to the interface. The external incubation environment conditioning unit is then connected to the microscope via the interface to establish a system according to the second aspect of the present inventive concept.

It is pointed out that the features described above in relation the microscope according to the first aspect and in relation to the system according to the second aspect of the present inventive concept represent an analogous description of the corresponding features of the two aspects and of the method according to the third aspect of the present inventive concept.

As used herein, the term "and/or" includes any and all combinations of one or more of the associated listed items and may be abbreviated as "/".

It should be noted that features of the above examples as well as of the examples explained below can—wholly or in part—be combined to other examples not explicitly mentioned herein, nevertheless being part of the present disclosure.

FIG. 1 schematically shows in a perspective view an embodiment of a microscope 100 for microscopic examination of a sample 120 arranged on a microscope stage 116. A microscope housing 102 encloses an illumination optics 118, the microscope stage 116 and an imaging optics 124. An integrated sample chamber 106 is located within the microscope housing 102 and formed by a separated housing section 104 within said microscope housing 102. The housing section 104 comprises a hinged lid 109 which provides direct access to the microscope stage 116 for placing the sample 120 in the sample chamber 106 onto the microscope stage 116 and for exchanging samples 120 and/or manipulating samples 120 when the lid is opened. The embodiment shown in FIG. 1 is an inverse transmitted-light microscope 100 where the transmitted-light illumination optics 118 is arranged within the housing section 104, while the imaging optics is located below the microscope stage 116 in a second housing section 122. The imaging optics 124 typically includes a microscope objective and an image detector as the main components. The image detector usually comprises a camera which generates microscopic images which are typically displayed on a display screen 142 outside the microscope housing 102.

The construction of the microscope housing section 104 allows—after closing the lid 109—to form a dedicated sample chamber 106 which constitutes a preferably sealed space which can be incubated such that during microscopic examination/imaging of living samples 120 like cells, the sample can be kept under favorable and stress-free environmental conditions. To this end, the housing section 104 comprises an interface 108 for connection of an external incubation environment conditioning unit 110 to the sample chamber 106. The interface 108 is configured to provide a connection between the conditioning unit 110 and the sample chamber 106, such that environmental conditions in the sample chamber 106 can be controlled when the conditioning unit 110 is connected to the interface 108.

Figure 2:
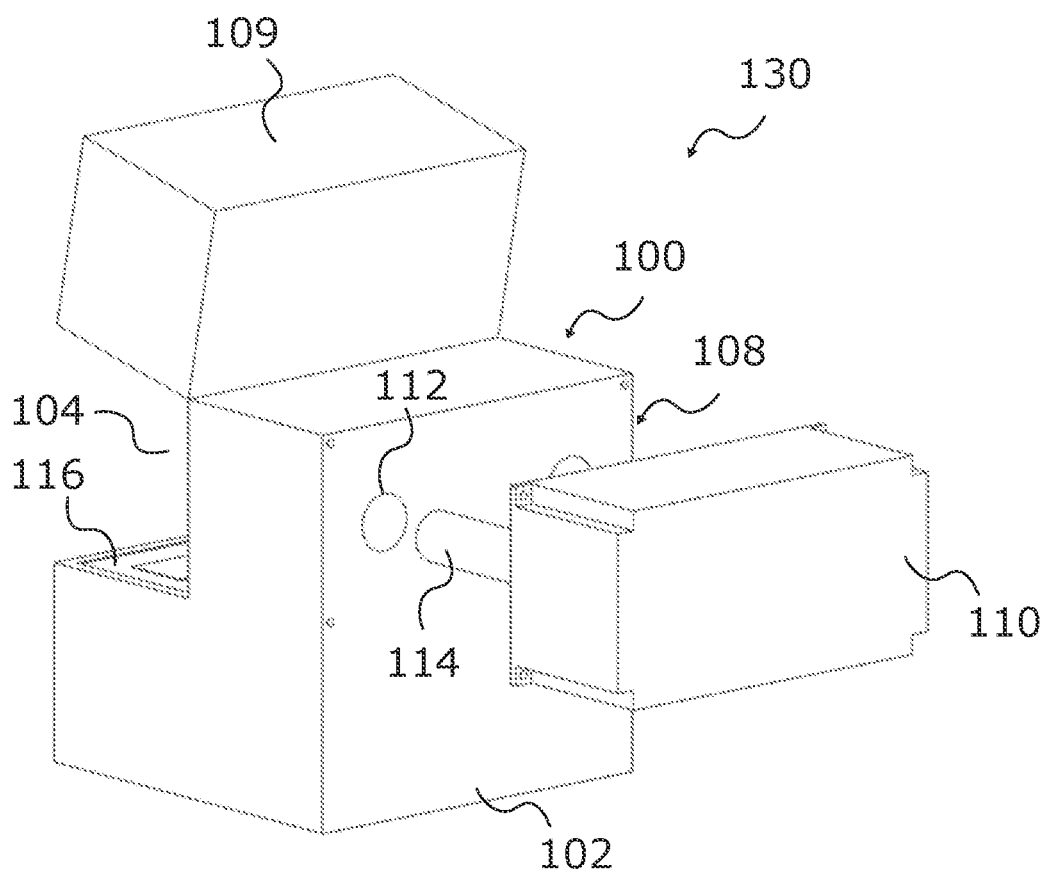
Figure 3:
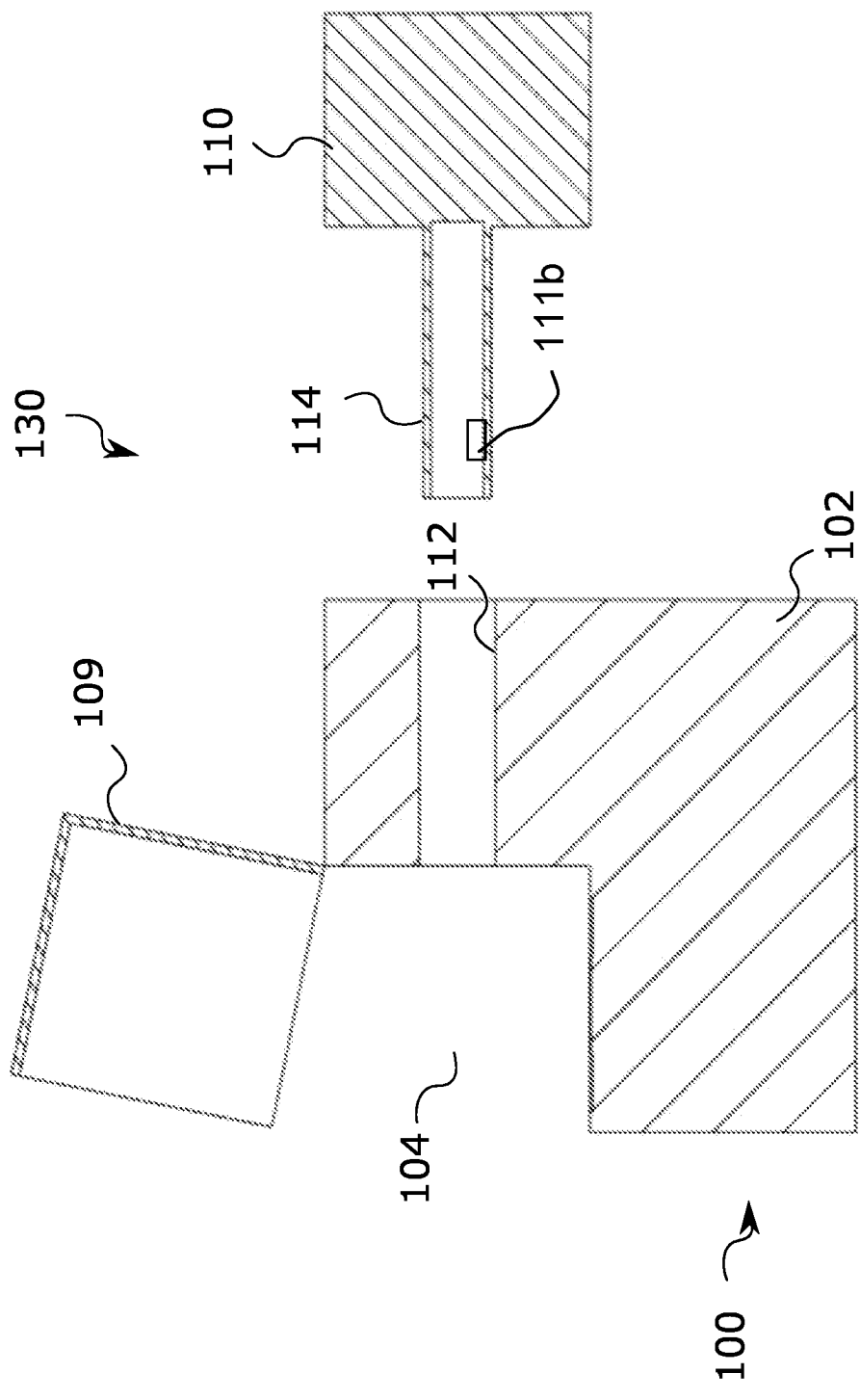

In the embodiment shown, the interface 108 as a part of the housing section 104 comprises two openings 112 in the backside of the housing section 104, each opening 112 being configured to receive a conduit 114 (see also FIGS. 2 and 3). Incubation atmosphere can be introduced through at least one of the conduits 114 into the sample chamber 106. Depending on the leakage of the sample chamber 106, a part of the incubation atmosphere is allowed to escape the sample chamber 106. On the other hand, a part of the incubation atmosphere can be withdrawn from the sample chamber 106 via another one of the conduits 114.

Suitable incubation atmospheres comprise air with a predefined content of $H_2O$ (relative humidity) and a predefined content of $CO_2$ (carbon dioxide). It is also desirable to conduct hypoxia experiments with a deficiency of oxygen in the atmosphere. Typically, the temperature of the incubation atmosphere can be set in a range between ambient temperature up to 50° C., the $CO_2$-range is set between 0.5 to 20%, and the $O_2$-range is between 1 to 18%. The humidity must be balanced to ensure that potential condensation is avoided or at least does harm neither the microscope 100 nor the conditioning unit 110 nor the sample itself. It is preferred to control at least the temperature, the humidity and the $CO_2$-content on its own. In hypoxia experiments, the $O_2$-content is controlled by $N_2$-input.

In order to control the above parameters, it is preferred to arrange sensors in the conduits 114 and/or in the sample chamber 106 and/or at the microscope stage 116 close to the sample 120. In a preferred embodiment, at least some of the sensors are integrated into a conduit 114 for supplying incubation atmosphere to the sample chamber 106.

As shown in FIG. 1, the housing section 104 is bounded downward by a working surface 107 including an upper side of the microscope stage, in other words the microscope stage tabletop. This construction provides a user-friendly access to the working area for placing and manipulating the sample 120. To the other sides, the housing section is bounded by the inner sides of the lid 109 and the backside of the housing section 104 itself.

For increasing the live span of the imaging optics 124 and in case of using immersion objectives, it is preferred to air condition and/or temperature-control the second housing section 122. This can either be done by the same conditioning unit 110 and a correspondingly enlarged interface 108 or, more preferred, by a separate air conditioning unit.

In a preferred embodiment, the microscope 110 comprises a controlling unit 140 that controls functional components like the illumination optics 118, the microscope stage 116 and the imaging optics 124 of the microscope 100 for controlling the microscopic examination/imaging of the sample 120. Typically, a graphical user interface (GUI) is displayed on the display screen 142 for a user-friendly operation of the microscope 100. The controlling unit 140 is further configured to control the operation of the incubation environment conditioning unit 110 when the conditioning unit 110 is connected to the interface 108. Cables and lines for communication between the microscope controlling unit 140 and a conditioning unit controller (not shown) can be guided through one or more of the above openings/conduits of the interface 108. In this case, the same GUI may display corresponding buttons for setting desired values for the incubation atmosphere parameters as mentioned above. After confirmation that the lid 109 is closed and the sample to be examined is placed on the table of the microscope stage 116, generation of the user-defined incubation atmosphere automatically starts and, once the desired atmosphere is established and the sample 120 is in the right position, examination/imaging of the sample is carried out.

As already mentioned above, FIG. 2 shows an assembling process of equipping a microscope 100 with an incubation environment conditioning unit 110 resulting in a system 130. Same reference signs as in FIG. 1 designate the same components. As shown in FIG. 2, interface 108 also comprises mounting sites for fixing the conditioning unit 110 at its corners to the backside of the microscope 100. The interface 108 further comprises openings 112 configured for receiving two conduits 114 of the conditioning unit 110, the two conduits 114 providing respective ducts through which incubation atmosphere is fed into the sample chamber 106. In this embodiment, the conduits 114 are connected to the conditioning unit 110 e.g. by welding or by a flanged connection. The assembling process shown in FIG. 2 is particularly suitable for retrofitting a microscope 100 with a conditioning unit 110.

FIG. 3 schematically shows a cross-section of the components shown in FIG. 2 in a side view. Again, same reference signs refer to same components. In order to avoid repetitions, reference is made to the descriptions of FIGS. 1 and 2. As can be seen from FIG. 3, the opening 112 has the form of a duct for receiving a conduit/tube/pipe 114, which is part of the conditioning unit 110. In another embodiment, the conduit 114 may be part of the interface 108 such that the end of the conduit would have to be connected to the conditioning unit 110.

REFERENCE SIGNS 100 microscope
102 microscope housing
104 housing section
106 sample chamber
107 working surface
108 interface
109 lid
110 incubation environment conditioning unit
112 opening
114 conduit
116 microscope stage
118 illumination optics
120 sample
122 second housing section
124 imaging optics
130 system
140 controlling unit
142 display screen

What is claimed is:

1. A microscope for microscopic examination of a sample comprising:
    a microscope housing enclosing illumination optics, a microscope stage and imaging optics;
    an integrated sample chamber located within the microscope housing and formed by a separated housing section within the microscope housing, the sample chamber being separated from the imaging optics; and
    the housing section comprising a lid providing direct access to the microscope stage for placing the sample in the sample chamber, the housing section being configured such that the sample chamber is sealed at a closed position of the lid;
    wherein the housing section comprises an interface for connection of an external incubation environment conditioning unit to the sample chamber, the interface being configured to provide a connection between the external incubation environment conditioning unit and the sample chamber for supplying an incubation atmosphere generated by the external incubation environment conditioning unit to the sample chamber, such that a plurality of environmental conditions of the incubation atmosphere in the sample chamber are controllable via the interface connected to the external incubation environment conditioning unit.

2. The microscope of claim 1, wherein the housing section at least partially encloses the microscope stage and a working area.

3. The microscope of claim 2, wherein the housing section further encloses the illumination optics.

4. The microscope of claim 1, wherein the housing section is bounded by a working surface, the working surface comprising an upper side of the microscope stage.

5. The microscope of claim 1, wherein the interface comprises at least one opening configured to receive a conduit, the conduit being connected to the external incubation environment conditioning unit, or wherein the interface comprises at least one opening including a conduit, which is connectable to the external incubation environment conditioning unit.

6. The microscope of claim 5, wherein the interface comprises a plurality of openings for respective conduits for supplying and discharging the incubation atmosphere.

7. The microscope of claim 1, further comprising at least one sensor for sensing at least one environmental parameter of the incubation atmosphere.

8. The microscope of claim 7, wherein the at least one sensor is at least partially integrated into a conduit.

9. The microscope of claim 1, wherein the interface is located at a backside of the housing section.

10. The microscope of claim 1, wherein the microscope is an inverse transmitted-light microscope, wherein the housing section at least partially encloses the microscope stage of the microscope and a transmitted-light illumination unit as the illumination optics of the microscope, and wherein a second housing section at least partially encloses the imaging optics of the microscope.

11. The microscope of claim 10, wherein the second housing section is configured to be air-conditioned and/or temperature-controlled.

12. A system for microscopic examination of a sample comprising:
- a microscope comprising a microscope housing enclosing illumination optics, a microscope stage and imaging optics;
- an integrated sample chamber located within the microscope housing and formed by a separated housing section within the microscope housing, the sample chamber being separated from the imaging optics;
- the housing section comprising a lid providing direct access to the microscope stage for placing the sample in the sample chamber, the housing section being configured such that the sample chamber is sealed at a closed position of the lid; and
- an incubation environment conditioning unit being connected to the microscope via a microscope interface;
- wherein the housing section comprises an interface for connecting an external incubation environment conditioning unit to the sample chamber, the interface for connection of the incubation environment conditioning unit and the sample chamber for supplying an incubation atmosphere generated by the external incubation environment conditioning unit to the sample chamber, such that a plurality of environmental conditions of the incubation atmosphere in the sample chamber are controllable via the interface connected to the incubation environment conditioning unit.

13. The system of claim 12, wherein the incubation environment conditioning unit comprises at least one of the following connections:
- a connection for supplying $H_2O$;
- a connection for discharging $H_2O$ and/or incubation atmosphere;
- a connection for supplying $N_2$ and/or $O_2$;
- a connection for supplying $CO_2$ into the sample chamber.

14. The system of claim 12 further comprising a controlling unit for controlling the illumination optics, imaging optics and the microscope stage for controlling microscopic examination of the sample, the controlling unit being further configured to control operation of the incubation environment conditioning unit via the interface connected to the incubation environment conditioning unit.

15. The system claim 14, wherein the controlling unit is configured to control at least one of the parameters being a temperature, a content of $H_2O$, a content of $CO_2$ and a content of $O_2$ of the incubation atmosphere.

16. A method for microscopic examination of a sample comprising:
- providing a microscope with an external incubation environment conditioning unit for incubating a sample chamber of the microscope, the microscope comprising:
  - a microscope housing enclosing illumination optics, a microscope stage and imaging optics;
  - an integrated sample chamber located within the microscope housing and formed by a separated housing section within the microscope housing, the sample chamber being separated from the imaging optics;
  - the housing section comprising a lid providing direct access to the microscope stage for placing the sample in the sample chamber, the housing section comprising an interface for connecting the external incubation environment conditioning unit to the sample chamber, the housing section being configured such that the sample chamber is sealed at a closed position of the lid;
- configuring the interface to provide a connection between the external incubation environment conditioning unit and the sample chamber for supplying an incubation atmosphere generated by the external incubation environment conditioning unit to the sample chamber;
- connecting the external incubation environment conditioning unit to the microscope via the interface; and
- controlling a plurality of the environmental conditions of the incubation atmosphere in the sample chamber via the interface connected to the external incubation environment conditioning unit.

17. An incubated system comprising:
a microscope for microscopic examination of a sample comprising:
- a microscope housing enclosing illumination optics, a microscope stage and imaging optics;
- an integrated sample chamber located within the microscope housing and formed by a separated housing section within the microscope housing, the sample chamber being separated from the imaging optics; and
- the housing section comprising a hinged lid providing direct access to the microscope stage for placing the sample in the sample chamber, the housing section being configured such that the sample chamber is sealed at a closed position of the lid;
- the housing section comprising an interface connecting an external incubation environment conditioning unit to the sample chamber for supplying an incubation atmosphere generated by the external incubation environment conditioning unit to the sample chamber, such that a plurality of environmental conditions of the incubation atmosphere in the sample chamber can be controlled via the interface connected to the external incubation environment conditioning unit; and
- the external incubation environment conditioning unit comprising a protruding conduit for insertion into an opening of the interface, the external incubation environment conditioning unit configured to be connected to the interface and serving to provide at least one incubation atmosphere into the sample chamber.

* * * * *